US 6,651,725 B1

(12) United States Patent
Hong

(10) Patent No.: US 6,651,725 B1
(45) Date of Patent: Nov. 25, 2003

(54) AIR CHARGED APPLIANCE

(76) Inventor: Tien-Chih Hong, 9F 3R, No. 210, Chung Hsueh Rd., Tainan City (TW)

(*) Notice: Subject to any disclaimer, the term of this patent is extended or adjusted under 35 U.S.C. 154(b) by 0 days.

(21) Appl. No.: 10/157,472

(22) Filed: May 23, 2002

(51) Int. Cl.⁷ ................................................. E06B 9/00
(52) U.S. Cl. ....................... 160/351; 4/506; 49/10; 52/2.25; 52/2.26; 114/345; 441/40
(58) Field of Search ........................... 114/345; 441/40, 441/41, 66; 52/2.25, 2.26, 2.11; 160/351, 352; 472/134; 4/506; 49/10, 21

(56) References Cited

U.S. PATENT DOCUMENTS

| | | | | |
|---|---|---|---|---|
| 2,876,467 A | * | 3/1959 | Lund | 441/40 |
| 3,390,491 A | * | 7/1968 | Hayden et al. | 174/35 MS |
| 3,490,085 A | * | 1/1970 | Lewis | 114/345 |
| 3,935,607 A | * | 2/1976 | Cantwell et al. | 114/345 |
| 4,159,551 A | * | 7/1979 | Iwai | 114/345 |
| 4,543,901 A | * | 10/1985 | Stringer | 114/67 A |
| 4,619,620 A | * | 10/1986 | Felter | 441/66 |
| 5,077,945 A | * | 1/1992 | Koeniger | 52/169.14 |
| 5,570,544 A | * | 11/1996 | Hale et al. | 52/2.18 |
| 5,924,144 A | * | 7/1999 | Peterson | 4/488 |
| 6,076,201 A | * | 6/2000 | Peterson | 4/506 |

FOREIGN PATENT DOCUMENTS

GB    2 172 509 A   *  9/1986

* cited by examiner

*Primary Examiner*—Sherman Basinger
(74) *Attorney, Agent, or Firm*—Pro-Techtor International Services

(57) ABSTRACT

An air charged appliance includes an air chamber and an air sac, made in various shapes for different uses. The air sac is placed in the air chamber and filled up with air to become inflated together with the air chamber, but the both are made separately from each other. The air chamber is not easy to break and able to endure bumping so the air charged appliance can be used for a long period of time.

1 Claim, 18 Drawing Sheets

AIR CHARGED APPLIANCE

BACKGROUND OF THE INVENTION

This invention relates to an air charging device, particularly to one used as a children's amusement swimming pool, an aquatic amusement boat, a temporary water-stopping wall, an amusement course or the like, able to endure bumping and prevent leaking.

A conventional air charged appliance, as shown in FIG. 1, is made of single-layer PVC plastic cloth 110. An air charged appliance made of such a plastic cloth 110 is likely to leak quickly after it is filled in air and used for a short time, therefore it is not suitable for being used as a children's toy swimming pool, an aquatic raft, a temporary water-stopping wall, a guiding obstacle for an amusement course or the like.

For instance, as shown in FIG. 2, in case the conventional air charged appliance is used as solid obstacles 11 of an amusement course or a training course, it has to be continually pumped in air by means of a pump 1 so as to provided adequate air for the solid obstacles 11 respectively connected with the air-transporting pipes 10, otherwise the obstacles 11 may become softened resulting from quick leaking of its interior air because they are made of single-layer PVC. Further, the air transporting pipes 10 connecting the obstacles 11 are exposed on the ground so they are liable to trip those who are playing around and hurt them.

In addition, the pump 1 has to operate incessantly in order to pump air into the obstacles 11, not only wasting electricity, but making noises as well.

SUMMARY OF THE INVENTION

The objective of this invention is to offer an air charged appliance used as a children's toy swimming pool, an aquatic raft, a temporary water-stopping wall, a guiding obstacle for an amusement course or the like, capable of enduring bumping and preventing leaking.

The feature of the invention is an air charged appliance made to have any shape for the purpose, consisting of one or more than one air chambers and one or more than one air sacs placed in the air chamber(s). The air chamber and the air sac are made separately. Then the air sac is inflated or deflated to inflate or deflate the air chamber together at the same time.

DETAILED DESCRIPTION OF THE PREFERRED EMBODIMENT

Figure 1:
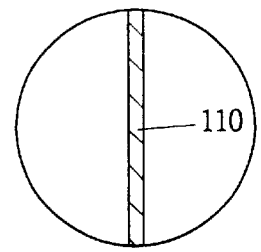
FIG. 1 is a partially magnified side cross-sectional view of a conventional air-filled obstacle.
Figure 2:
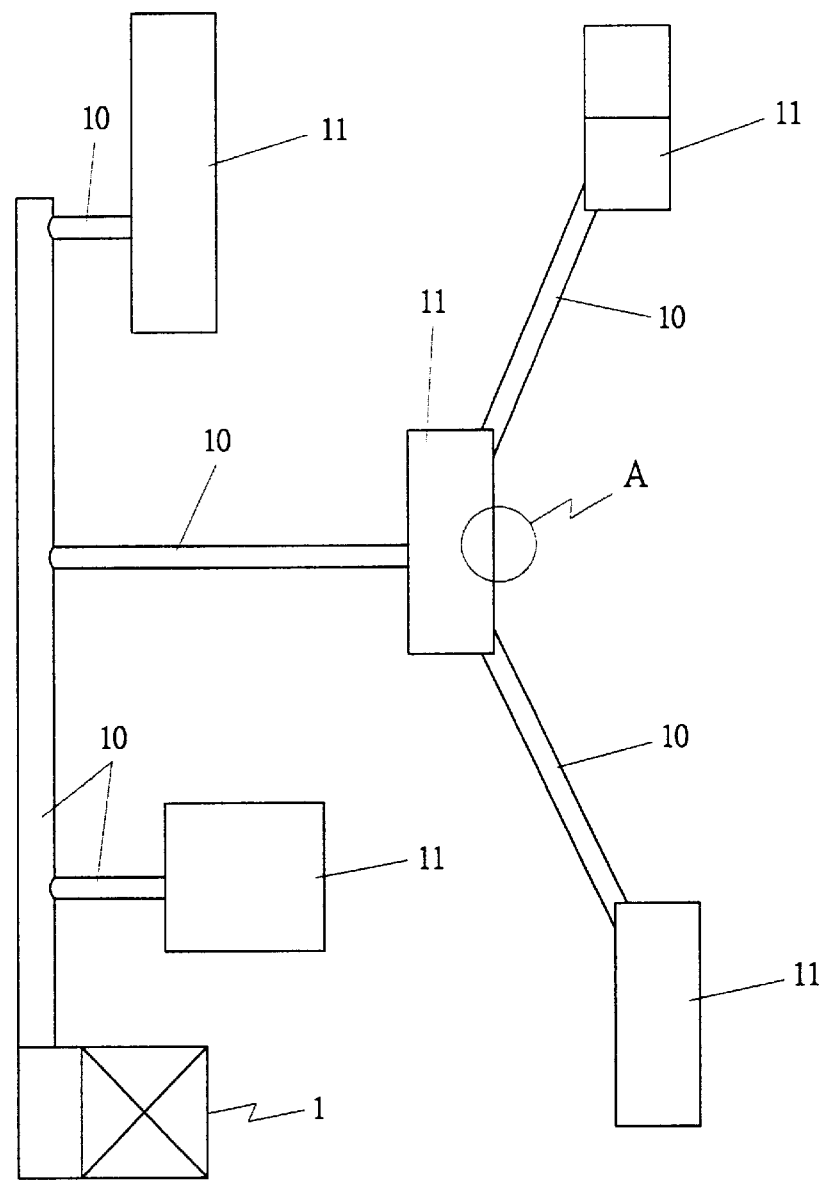
FIG. 2 is a top view of an amusement course with conventional air-filled obstacles.
Figure 3:
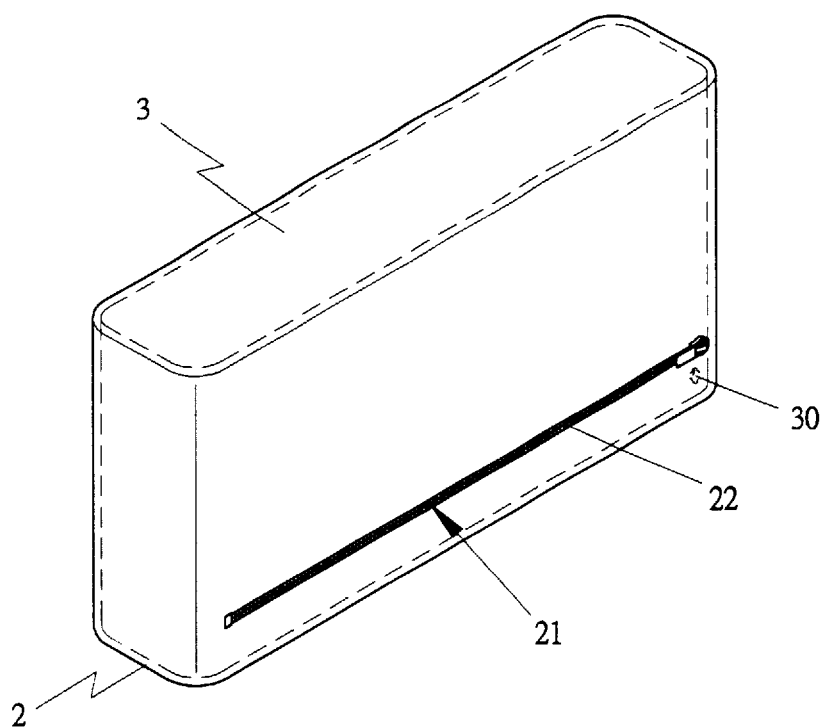
FIG. 3 is a perspective view of an air charged appliance in the present invention.
Figure 4:
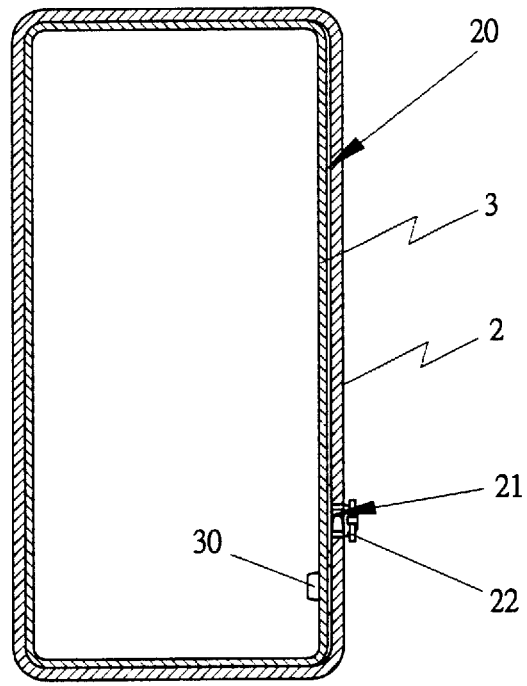
FIG. 4 is a cross-sectional view of the air charged appliance in the present invention.
Figure 5:
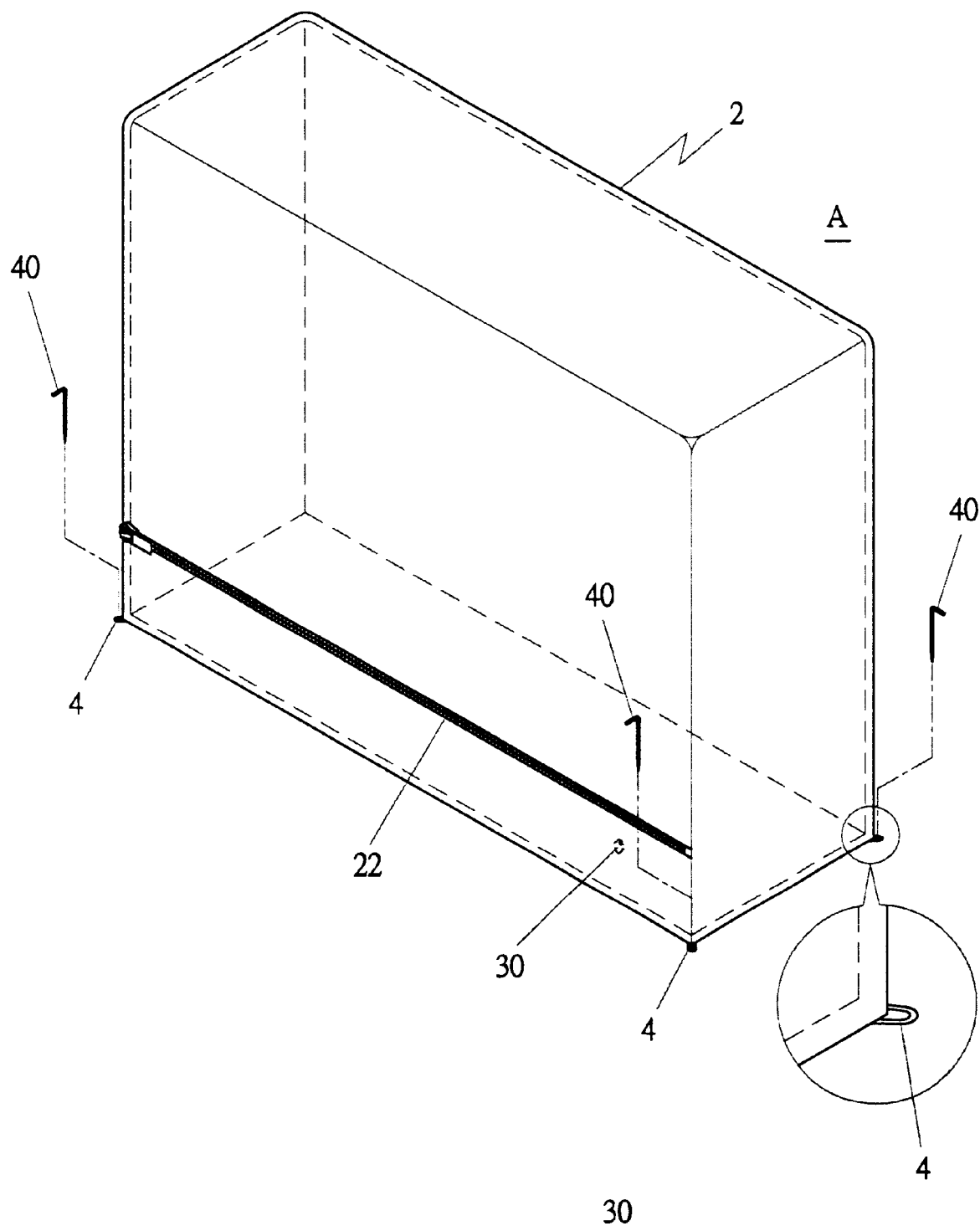
FIG. 5 is a perspective view of a first embodiment of the air charged appliance used as an obstacle in the present invention.
Figure 6:
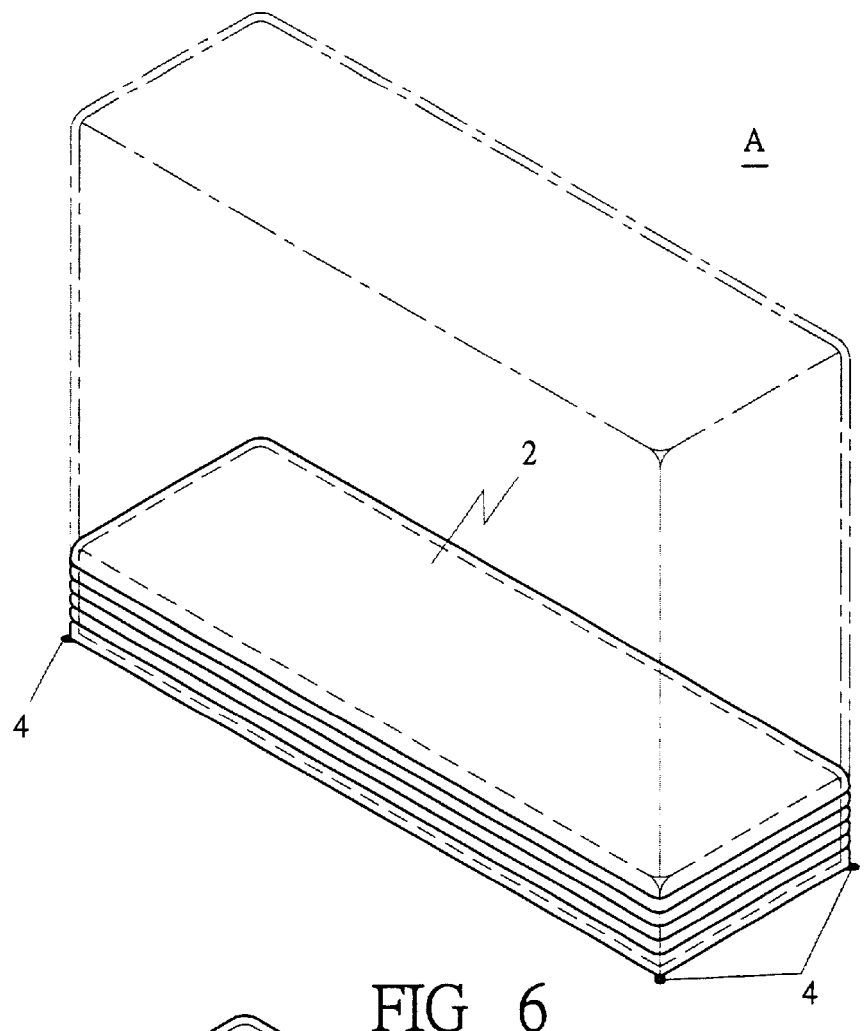
FIG. 6 is a perspective view of the first embodiment of the air charged appliance used as an obstacle not filled with air in the present invention.

A preferred embodiment of an air charged appliance in the present invention, as shown in FIGS. 3 and 4, includes an air chamber 2 and an air sac 3 combined together.

The air chamber 2 has an interior space for receiving the air sac 3. The air chamber 2 is made of special nylon of high tensile strength uneasy to break and able to endure bumping. The air chamber 2 has a fill opening 21 for the air sac 3 to be pushed in there through, and the fill opening 21 is provided with a fastening member 22 such as a Velcro band or a zipper. Before filled with air, the air sac 3 is put into the air chamber 2 and then pumped in with air to become inflated together with the gas chamber 2. Separated from the air chamber 2, which is able to endure bumping, the air sac 3 itself can prevent leaking.

Each air chamber 2 can receive one air sac 3, as shown in FIGS. 3 and 4, or one or more air sacs 3, and each air sac 3 is provided with an air valve 30 for filling in air independently. Thus, when the air charged appliance is used as a toy swimming pool or a raft, and should one of the air sacs 3 be broken, the circumferential wall of the toy swimming pool or the raft would not collapse, keeping the toy swimming pool or the raft functioning normally and ensuring the users' safety.

In addition, the size of the interior space of the air chamber 2 may be made a little smaller than the air sac 3 so that the inflating size of the air sac 3 can be limited to prevent pump too much air so as to keep the air sac 3 elastic.

Another preferred embodiment of the air charging device used as the obstacle (A) of an amusement course in the present invention, as shown in FIGS. 5–13, includes an air chamber 2 and an air sac 3. The air chamber 2 is provided with a plurality of nail-fastening rings 4 at the lower ends for fixing nails 40 to pass there through respectively and then nailed tightly into soft ground to stabilize the obstacle (A).

Figure 7:
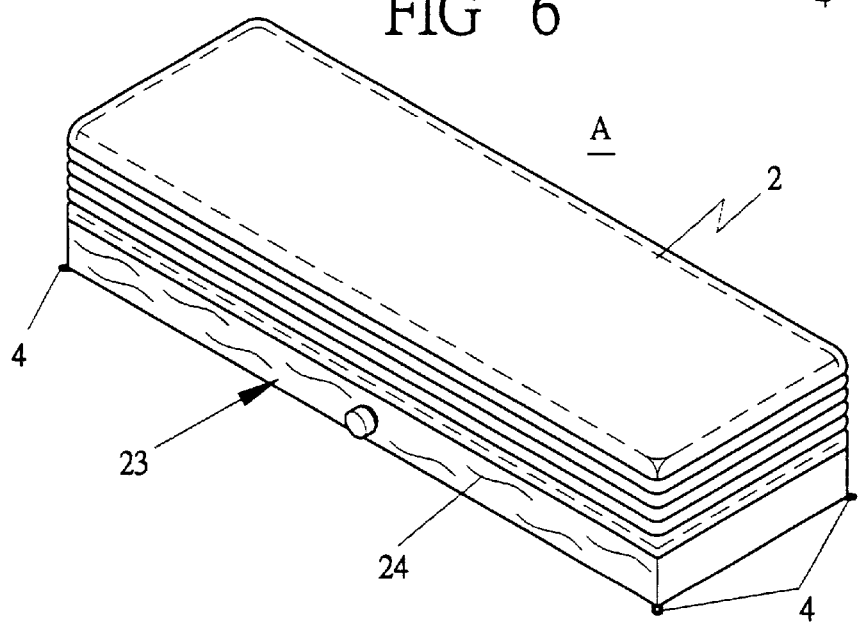
FIG. 7 is a perspective view of a second embodiment of the air charged appliance used as an obstacle not filled with air in the present invention.
Figure 8:
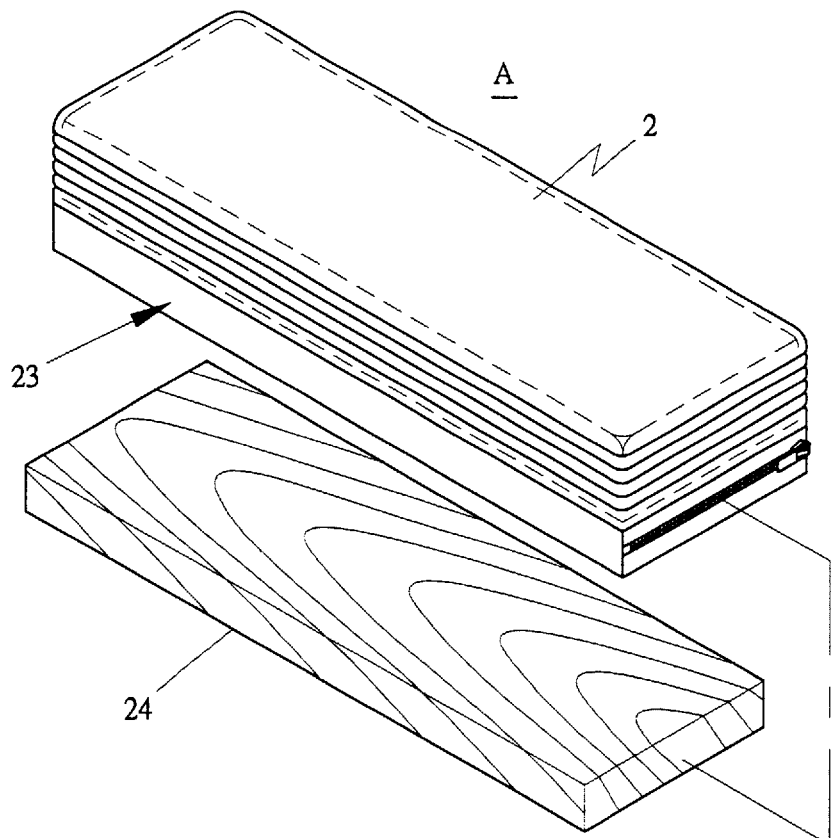
FIG. 8 is a perspective view of a third embodiment of the air charged appliance used as an obstacle not filled with air in the present invention.
Figure 9:
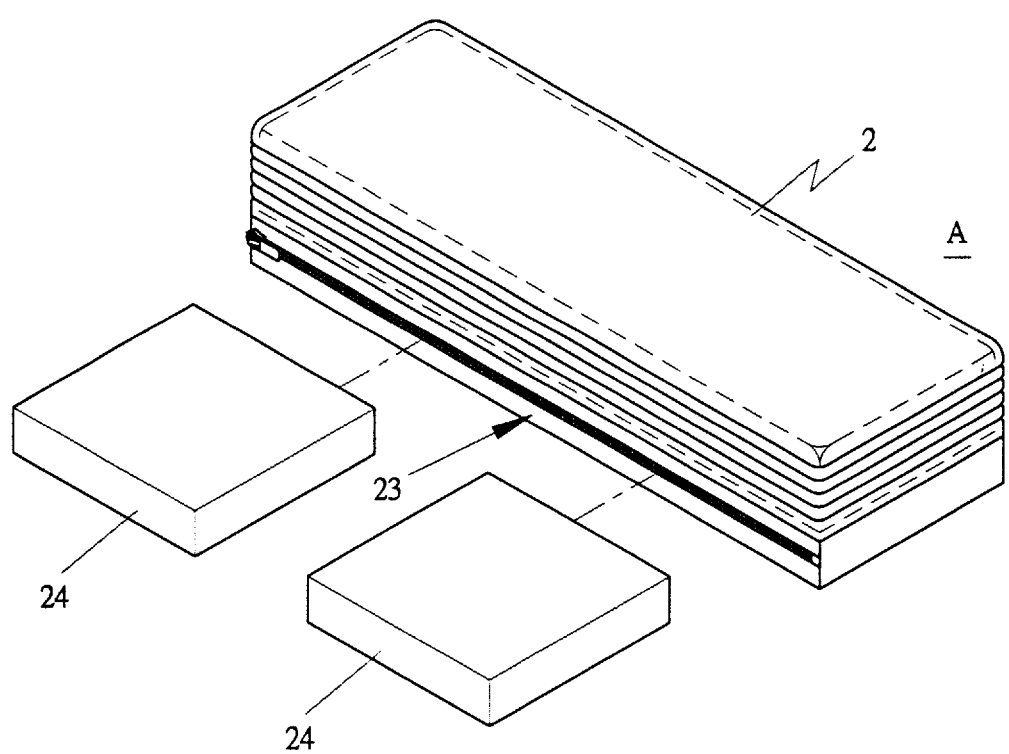
FIG. 9 is a perspective view of a fourth embodiment of the air charged appliance used as an obstacle not filled with air in the present invention.
Figure 10:
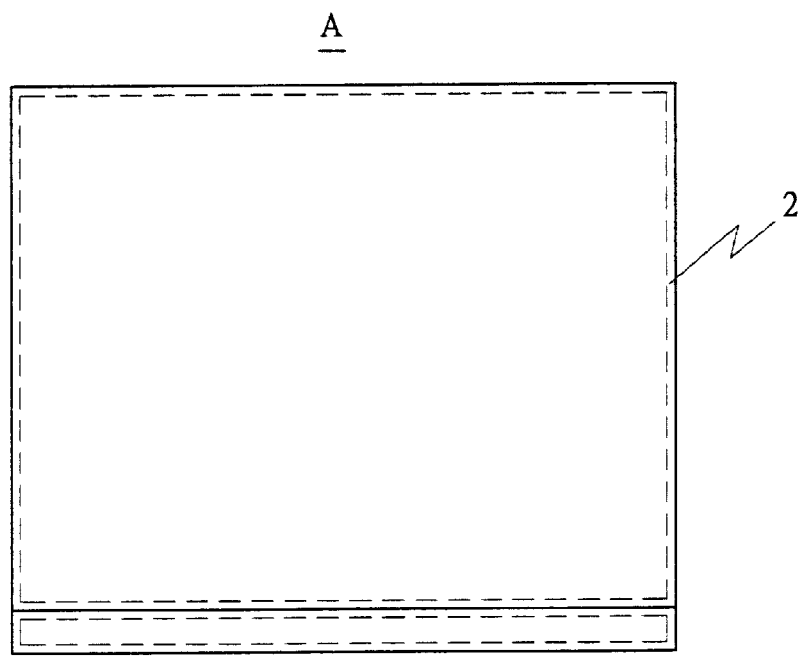
FIGS. 10(A), 10(B) and 10(C) are cross-sectional views of the air charged appliance in various shapes in the present invention.
Figure 10:
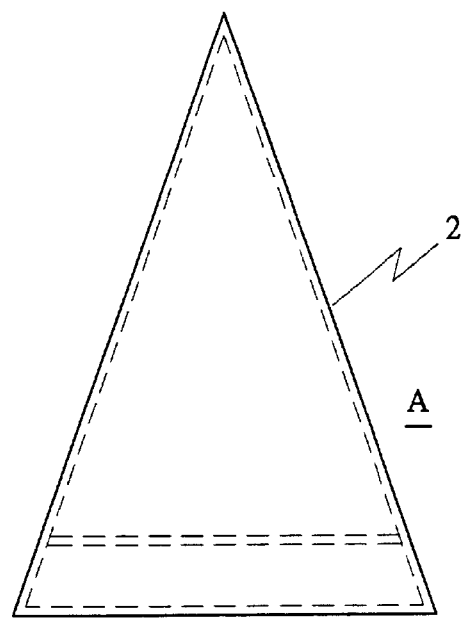
Figure 10:
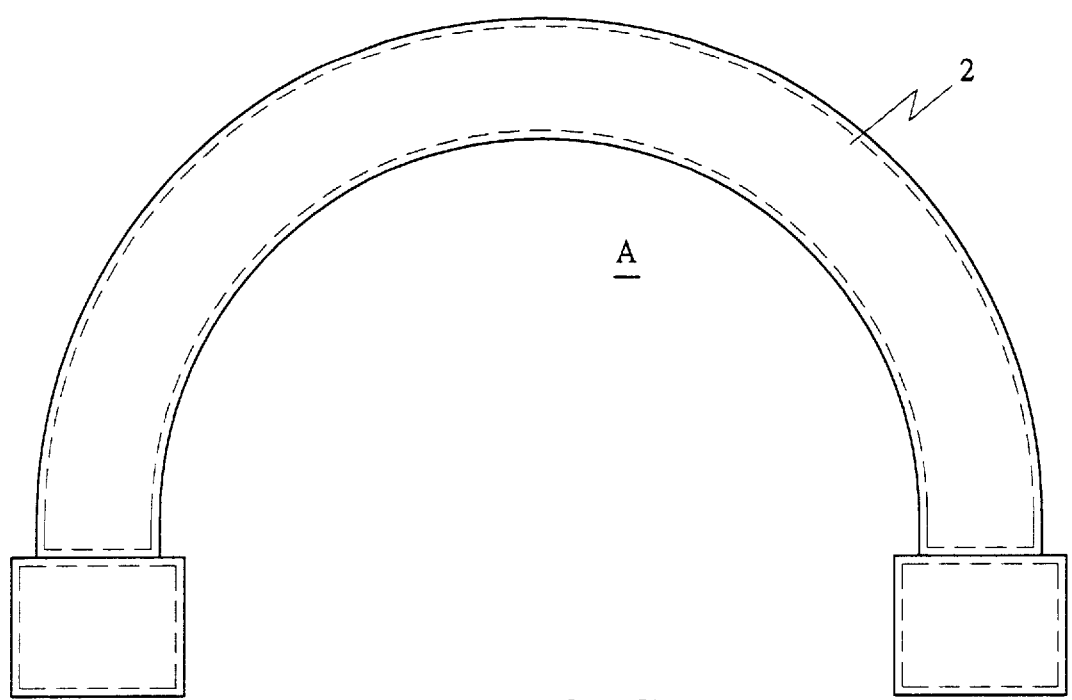

In case the obstacles (A) for an amusement course is to be positioned on a hard ground such as a concrete ground, the air chamber 2 can be additionally provided with a receiving space 23 in the bottom to be filled in with heavy matter 24 such as liquid shown in FIG. 7, wooden planks shown in FIG. 8, stones shown in FIG. 9, or the like so long as it (they) can secure the obstacle (A) in position, regardless of the heavy matter made of any material.

Figure 11:
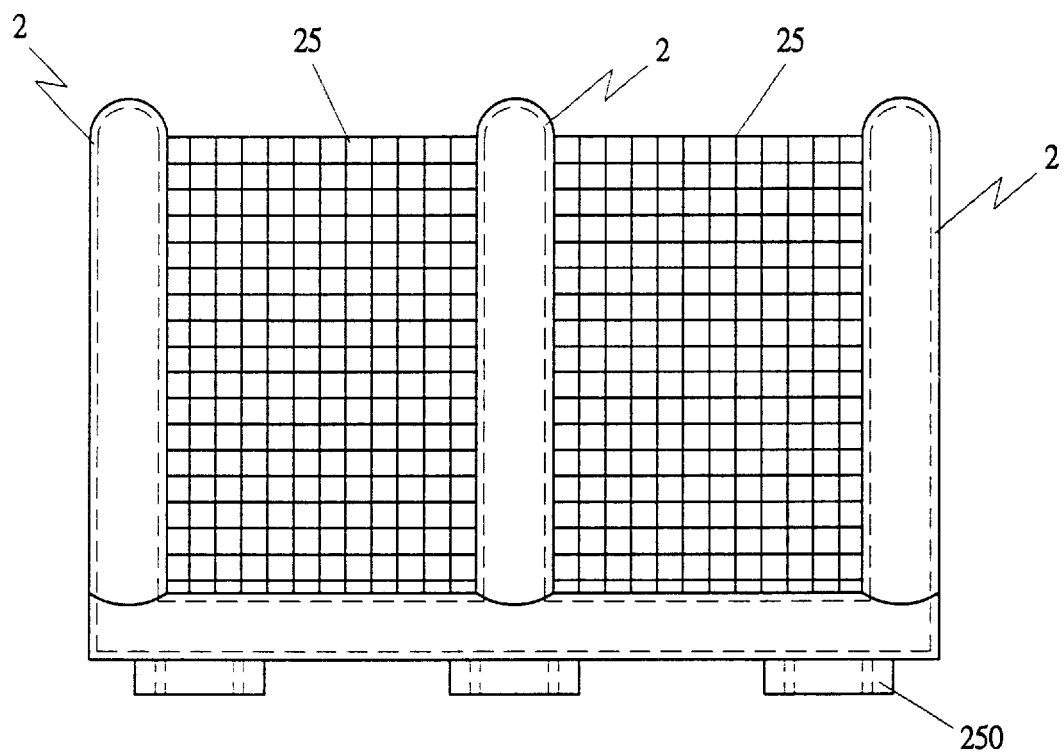
FIG. 11 is a cross-sectional view of a fifth embodiment of the air charged appliance used as an obstacle in the present invention.
Figure 12:
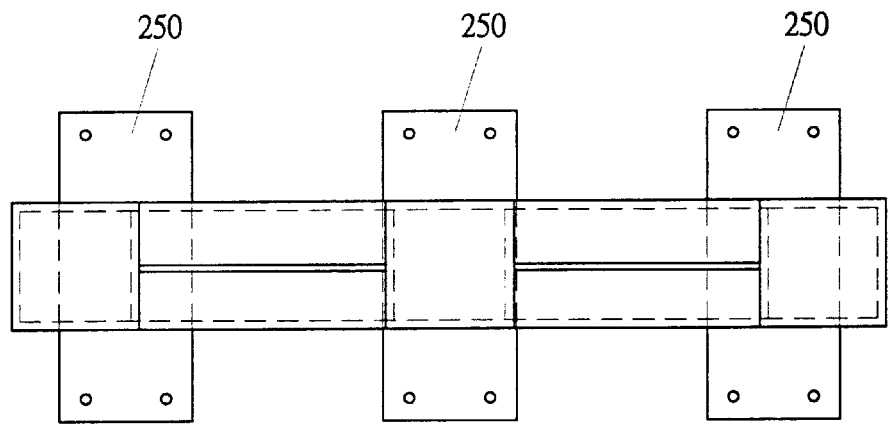
FIG. 12 is an upper view of the fifth embodiment of the air charged appliance used as an obstacle in the present invention.
Figure 13:
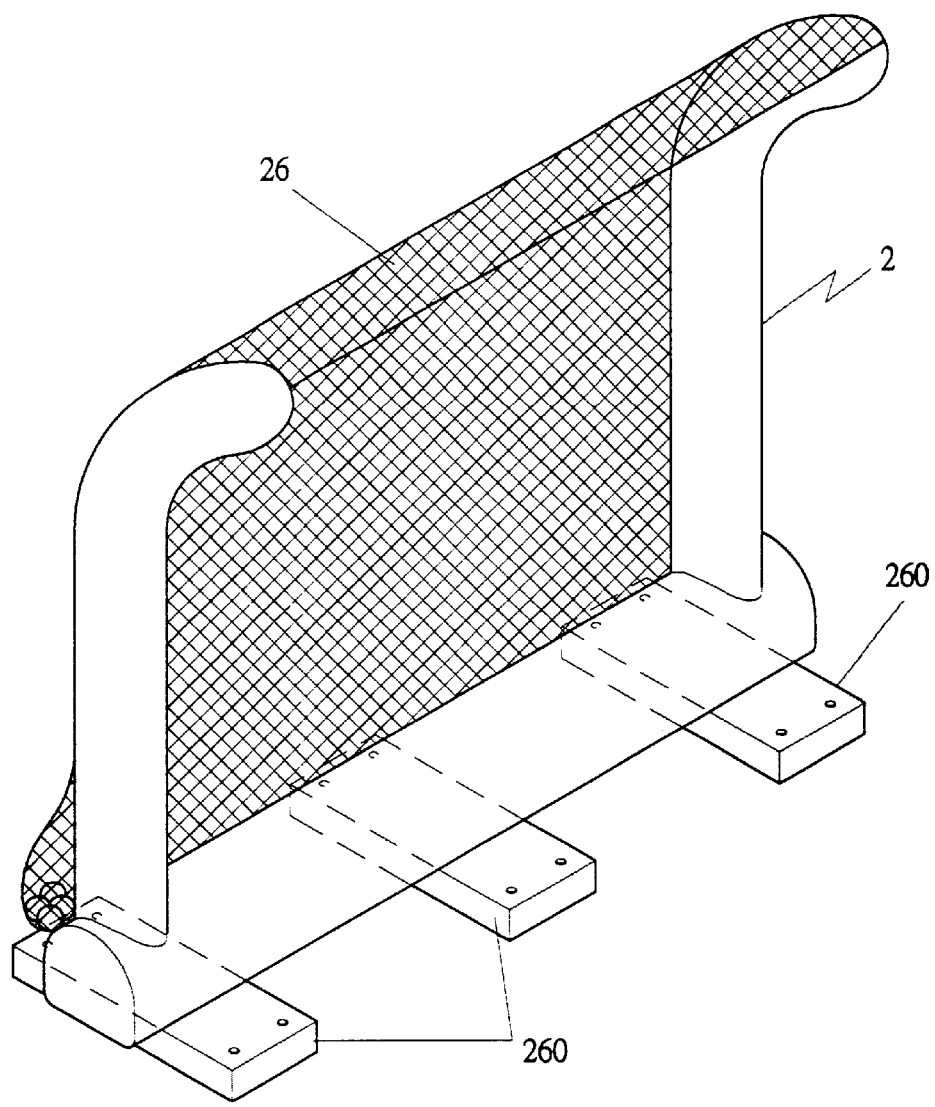
FIG. 13 is a perspective view of a sixth embodiment of the air charged appliance used as an obstacle in the present invention.

Furthermore, the air-filled obstacles (A) can be made in any solid shapes such as a solid square shown in FIG. 10(A), or a solid triangle shown in FIG. 10(B), or a solid arch shown in FIG. 10(C), or a safety obstacle with a net surface 25 shown in FIGS. 11 and 12, or a golf ball-receiving net 26 or a volley ball net, as shown in FIG. 13. If the air-filled obstacle (A) together with a net surface 25 is used as a safety obstacle or as a ball-receiving net 26, it can be fixed on the ground by means of a plurality of bases 250, 260.

Evidently, the air charging device of the invention has its air sac 3 filled in with air to become inflated together with the air chamber 2, and the air inside the air sac 3 can hardly leak out, enabling the obstacle (A) maintain its shape and function normally.

Figure 14:
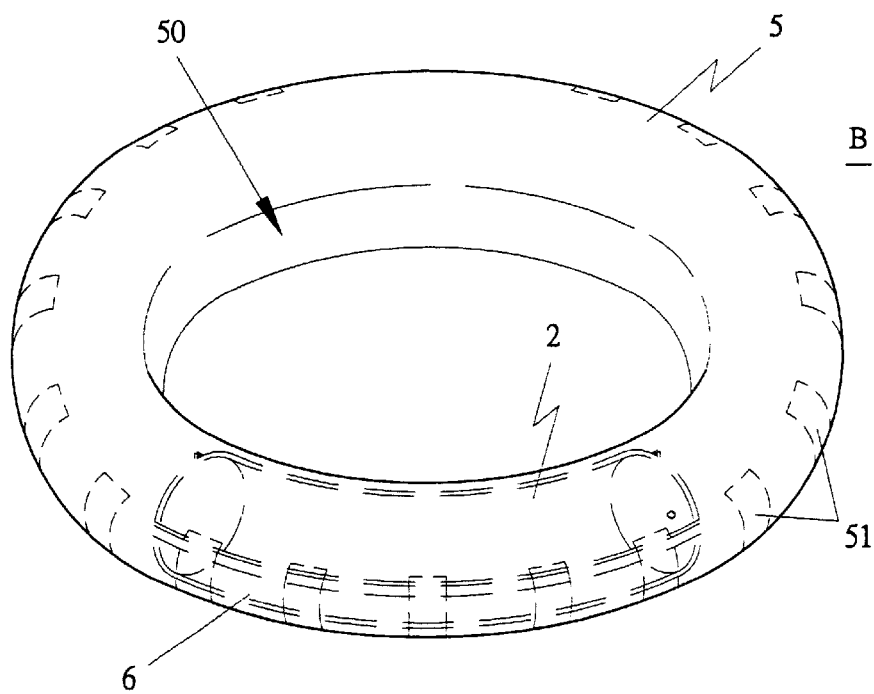
FIG. 14 is a perspective view of a first embodiment of an air charged appliance used as a swimming pool in the present invention.
Figure 16:
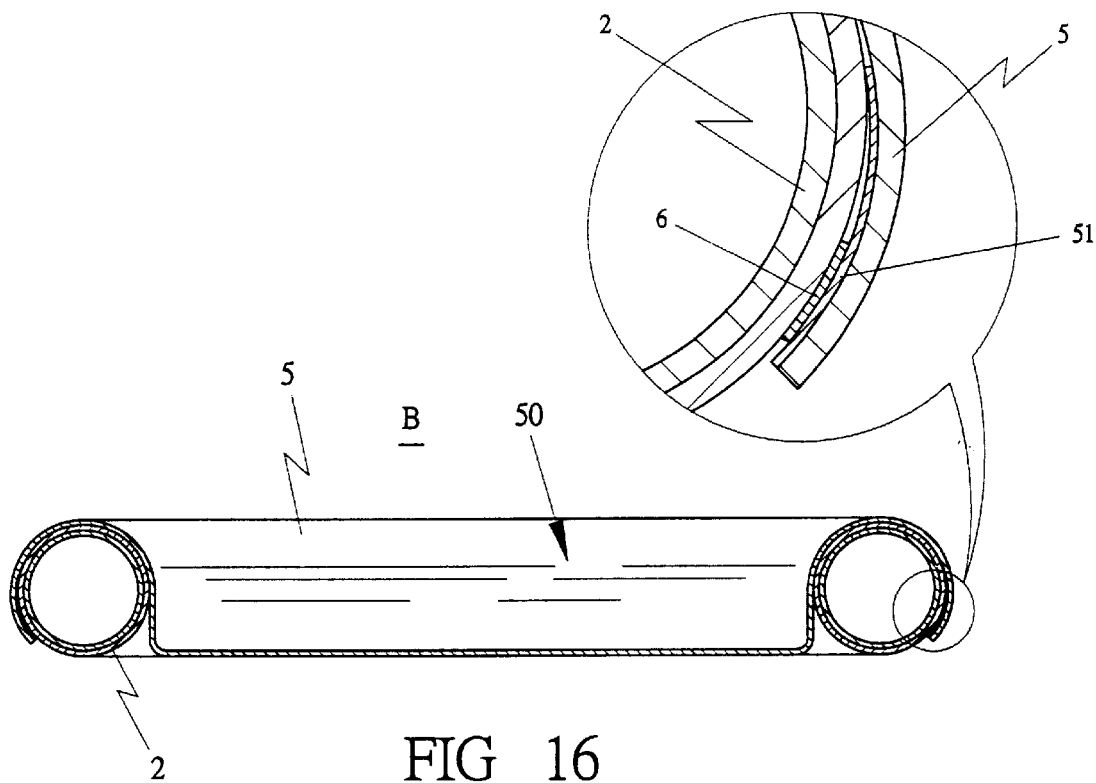
FIG. 16 is a cross-sectional view of the first embodiment of the air charged appliance used as a swimming pool in the present invention.
Figure 15:
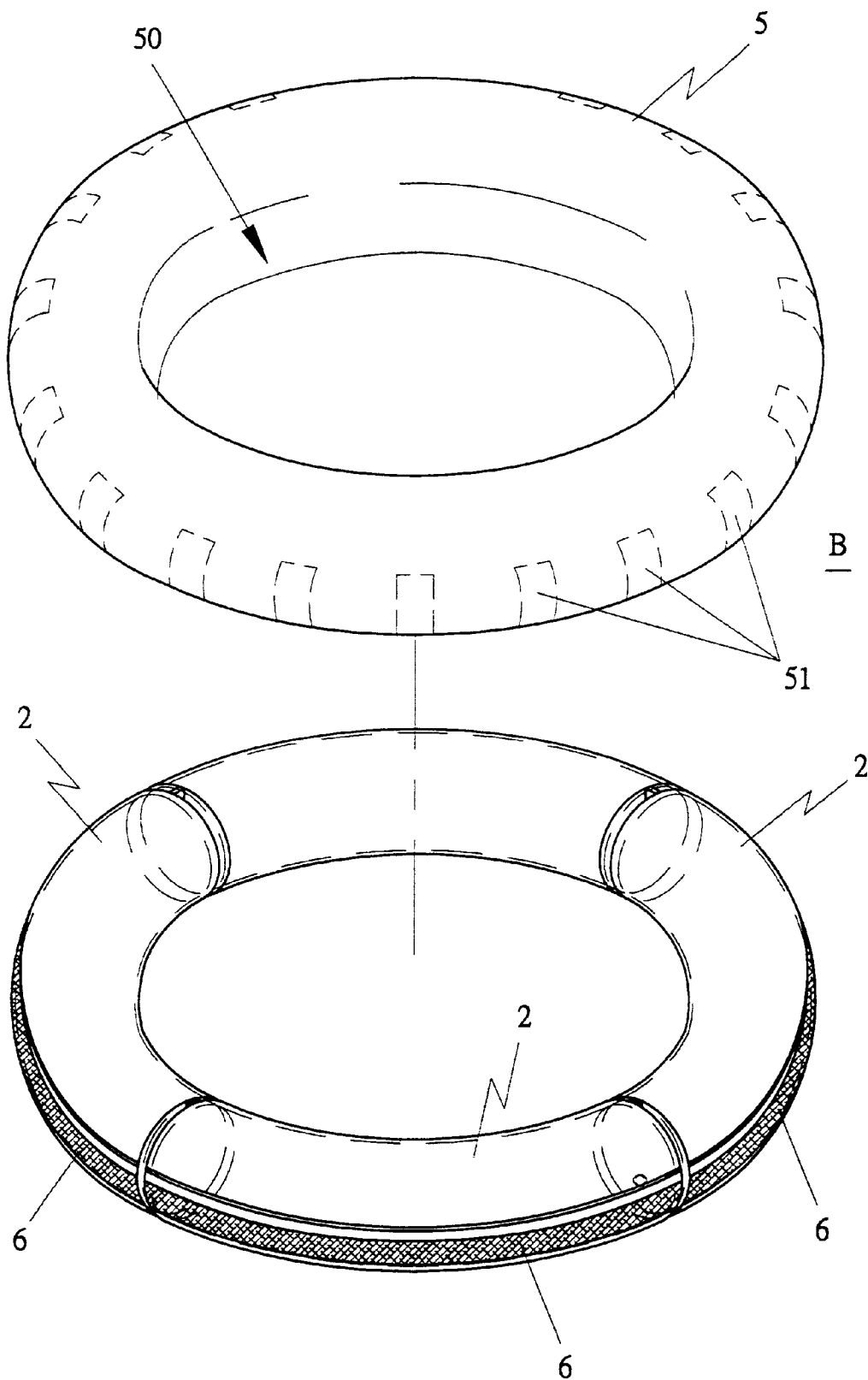
FIG. 15 is an exploded perspective view of the first embodiment of the air charged appliance used as a swimming pool in the present invention.
Figure 19:
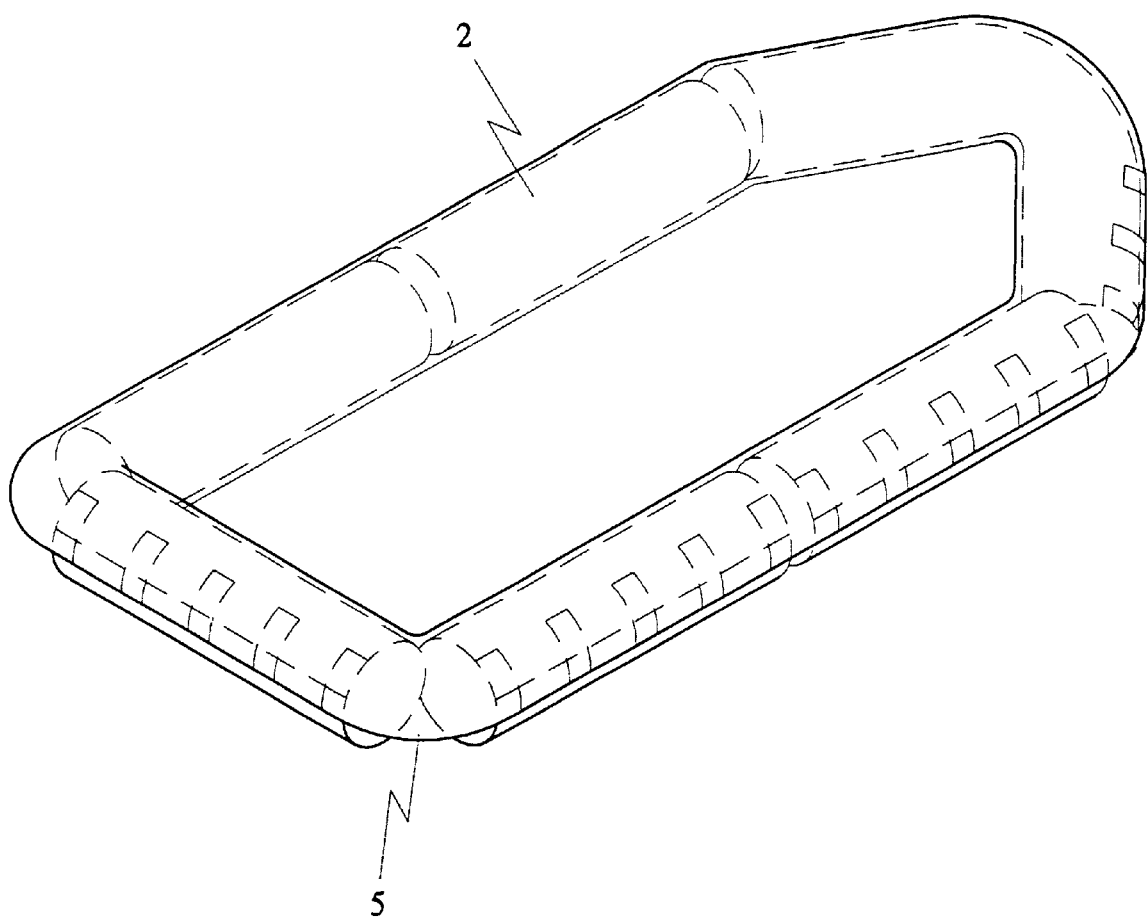
FIG. 19 is a perspective view of an air charged appliance used as an aquatic raft in the present invention.
Figure 20:
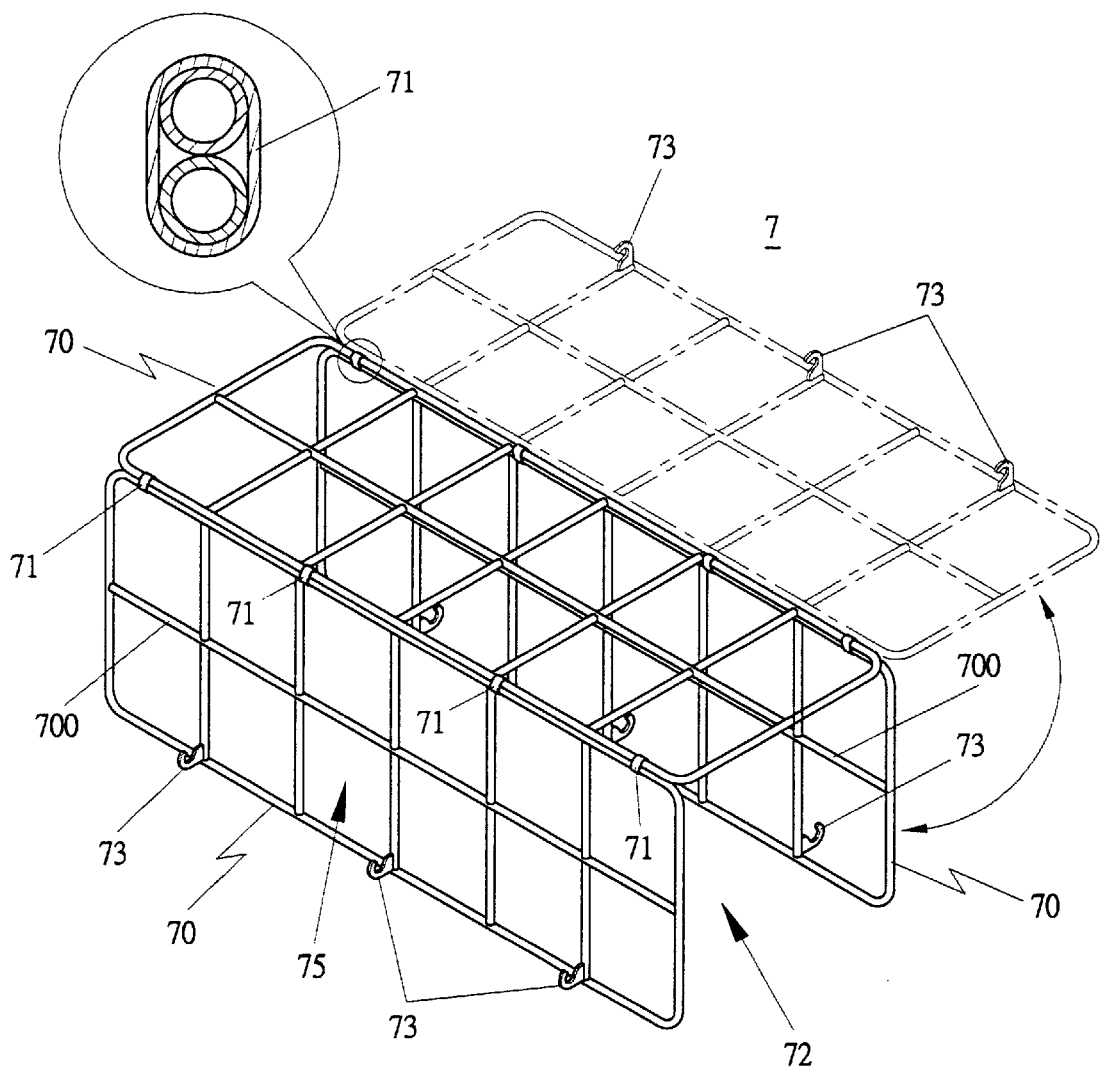
FIG. 20 is a perspective view of a first embodiment of an expanded frame with a plurality of air charged appliances used as a water-stopping wall in the present invention.

One more preferred embodiment of an air charging device used as a children's swimming pool (B) or a raft in the present invention, as shown in FIGS. 14–19, includes a body 5 and air chambers 2. The body 5 can be employed as the bottom of a swimming or a playing pool to be filled with a large amount of water, or as a receiving groove of a no-power raft for carrying persons to move on the water by paddling, as shown in FIG. 19, with the raft also possible to be provided with power. The body 5 is provided with a plurality of fastening members 51 (Velcro bands preferably), as shown in FIGS. 14–16.

Figure 17:
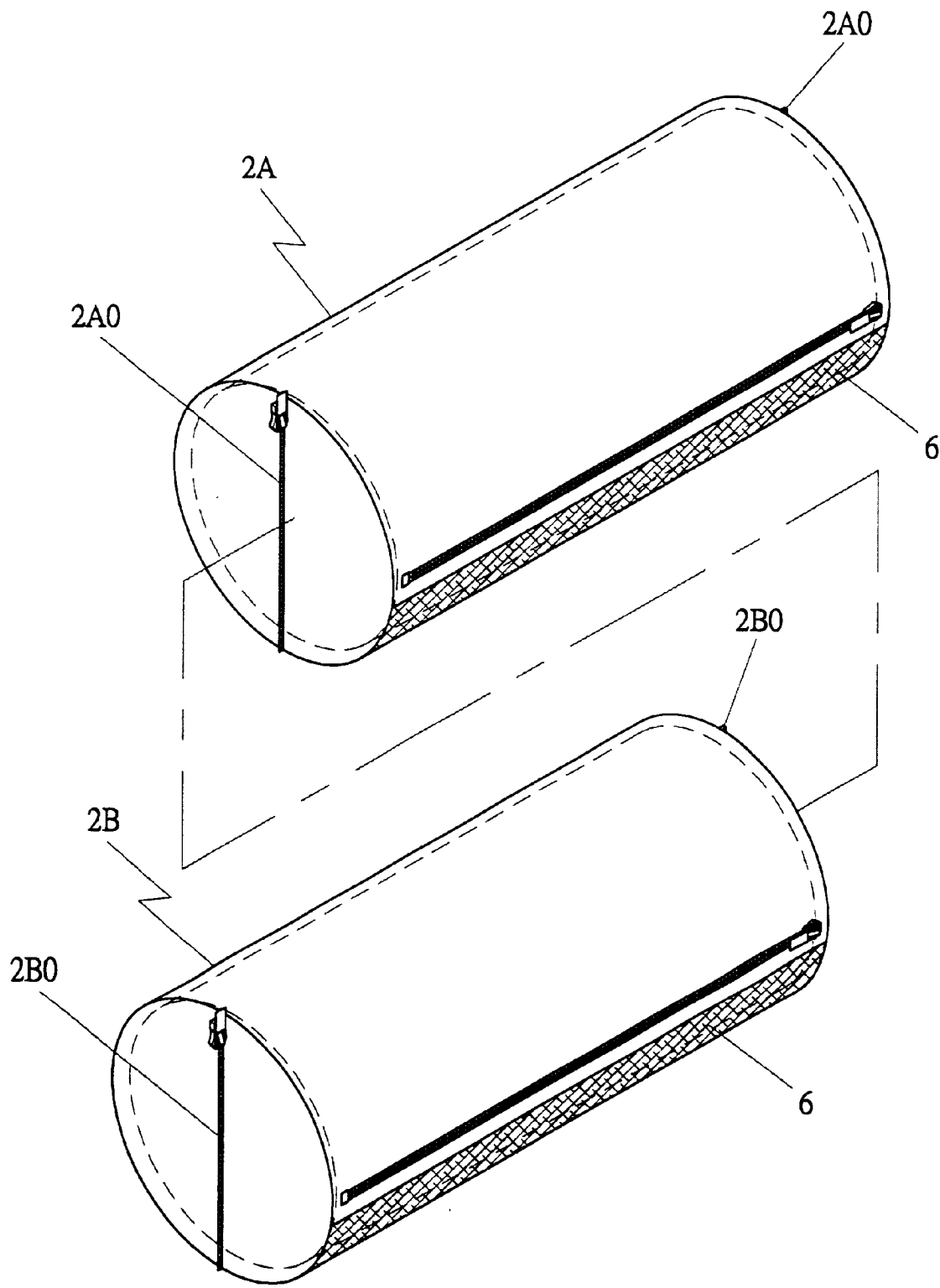
FIG. 17 is a perspective view of the first embodiment of the air charged appliances to be connected and used as a toy swimming pool in the present invention.
Figure 18:
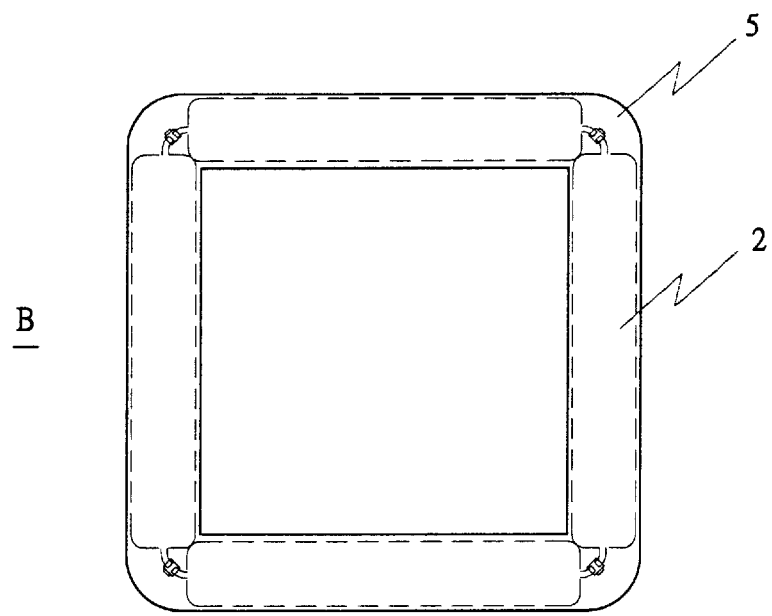
FIGS. 18(A) and 18(B) are upper views of the first embodiment of the air charged appliances in different shapes in the present invention.
Figure 18:
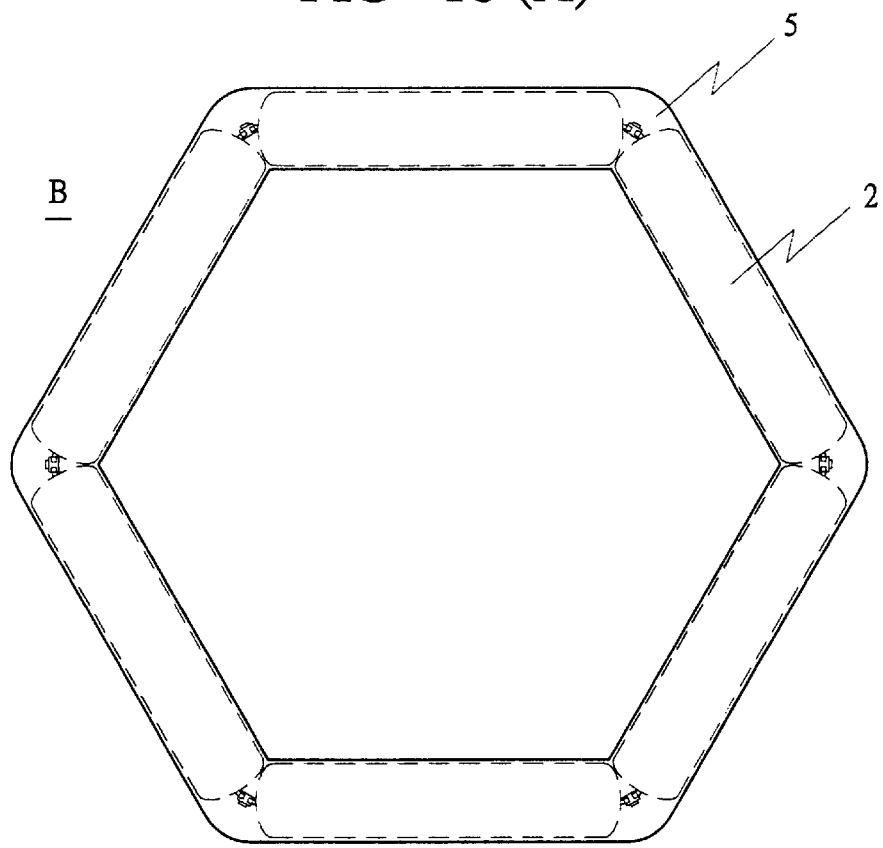

Then, the body 5 may be provided inside with air chambers 2, and each air chamber 2 has a fastening member 6 at a proper position, as shown in FIG. 17. After the body 5 receives the air chambers 2 and covers up part of them, the fastening members 51 of the body 5 and the fastening members 6 of the air chambers 2 are combined together to make up a toy swimming pool or a raft. Besides, the air chamber 2 can be composed of several air chambers 2A and 2B, which are connected together by means of the connecting members 2AO and 2BO provided at the opposite ends of each air chamber 2A or 2B to make up the wall of a pool or a yacht. The plural air chambers 2A and 2B can be arranged in any shapes.

Moreover, the toy swimming pool or the raft in this invention can be made in various shapes, as shown in FIGS. 18A, 18B and 19, therefore the body 5 is not necessarily to be made in a definite shape.

Still one more preferred embodiment of an air charging device used as a water-stopping wall in the present invention, as shown in FIGS. 20–25, includes an air chamber 2 and a frame 7.

Figure 21:
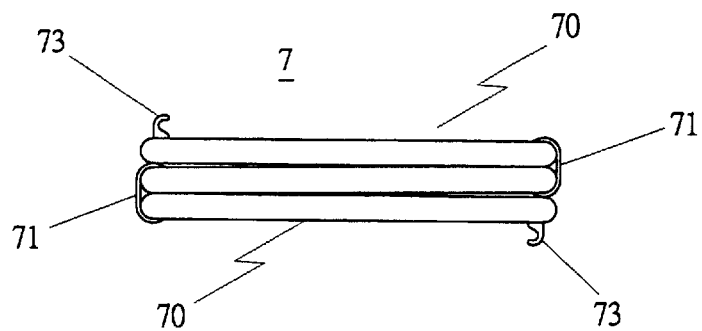
FIG. 21 is a cross-sectional view of the first embodiment of the collapsed frame in the present invention.
Figure 22:
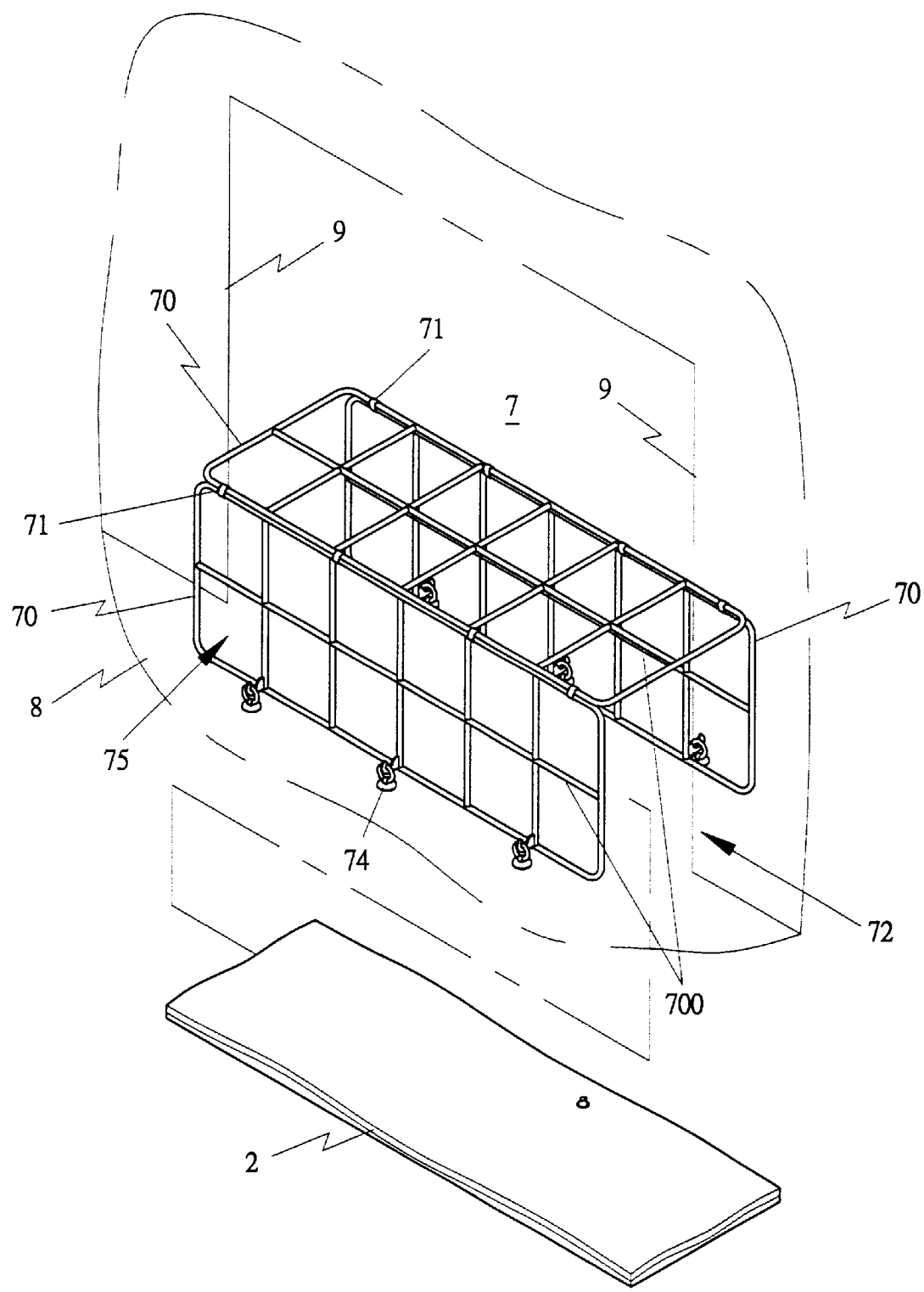
FIG. 22 is an exploded perspective view of the first embodiment of the air charged appliance used as a water-stopping wall in the present invention.

The frame 7 is formed with an upper side 70, a front side 70 and a rear side 70 respectively having a large number of ribs 700 arranged crosswise. Whether the ribs 700 are arranged densely or thinly depends on practical needs, and they are provided to confine the inflation direction of the air chamber 2 so as to fix it at a definite location. Then, the adjacent sides of the frame 7 are movably connected together by means of binding members 71 to make the frame 7 collapsible, as shown in FIG. 21.

Additionally, the frame 7 has an open side 72 at opposite ends for the inflated air chamber 2 to expand out there through. The frame 7 is provided with a plurality of hooks 73 at the bottom to engage with the hook rings 74, which are fixed and somewhat hidden on the ground so as to stably keep the frame 7 in place, with the hook rings 74 not protruding out of the ground. The frame 7 is further formed with an air chamber space 75 in the interior for receiving the air chamber 2.

Figure 23:
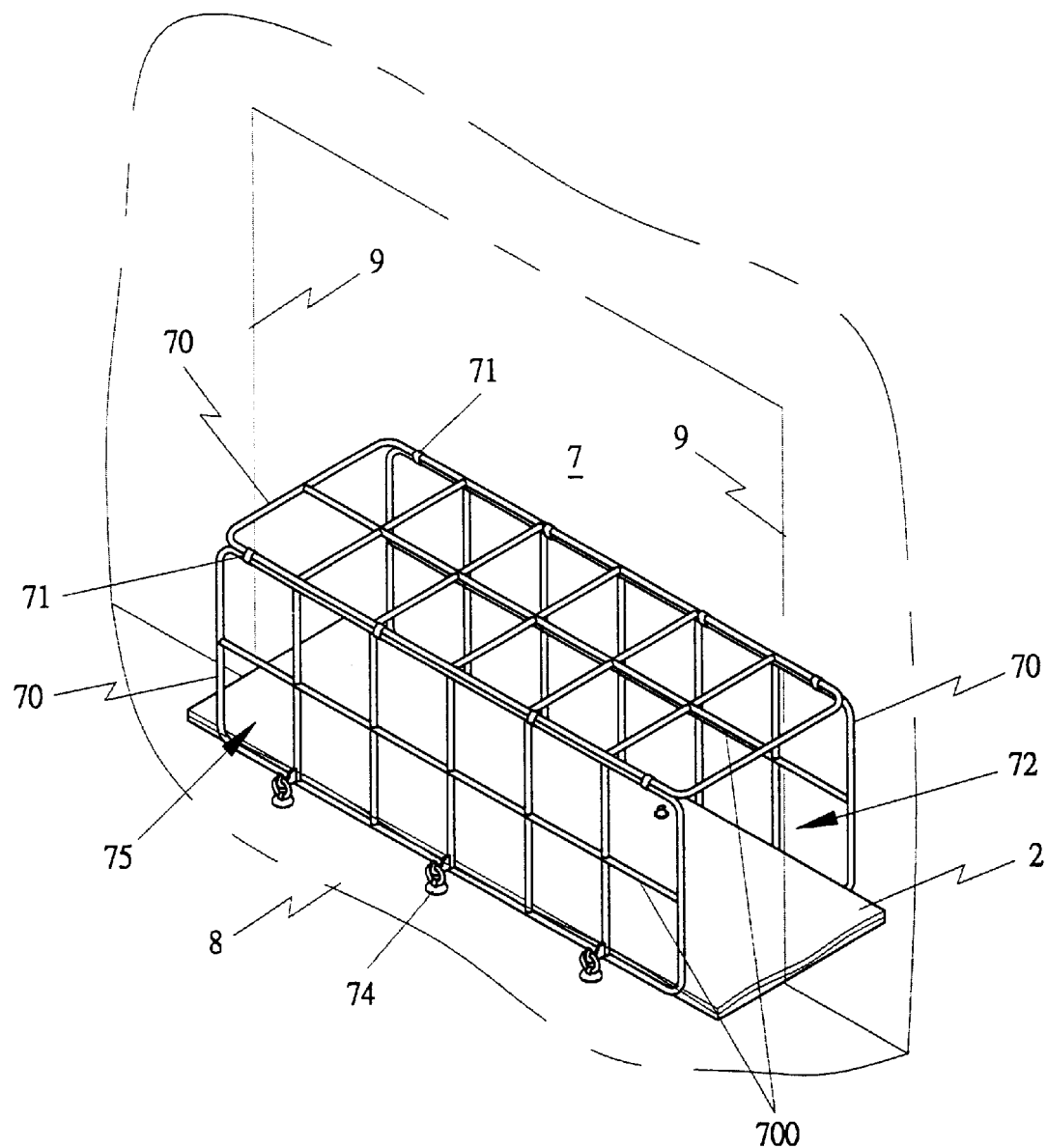
FIG. 23 is a perspective view of the first embodiment of the air charged appliance in a deflated condition assembled with the expanded frame to be used as a water-stopping wall in the present invention.
Figure 24:
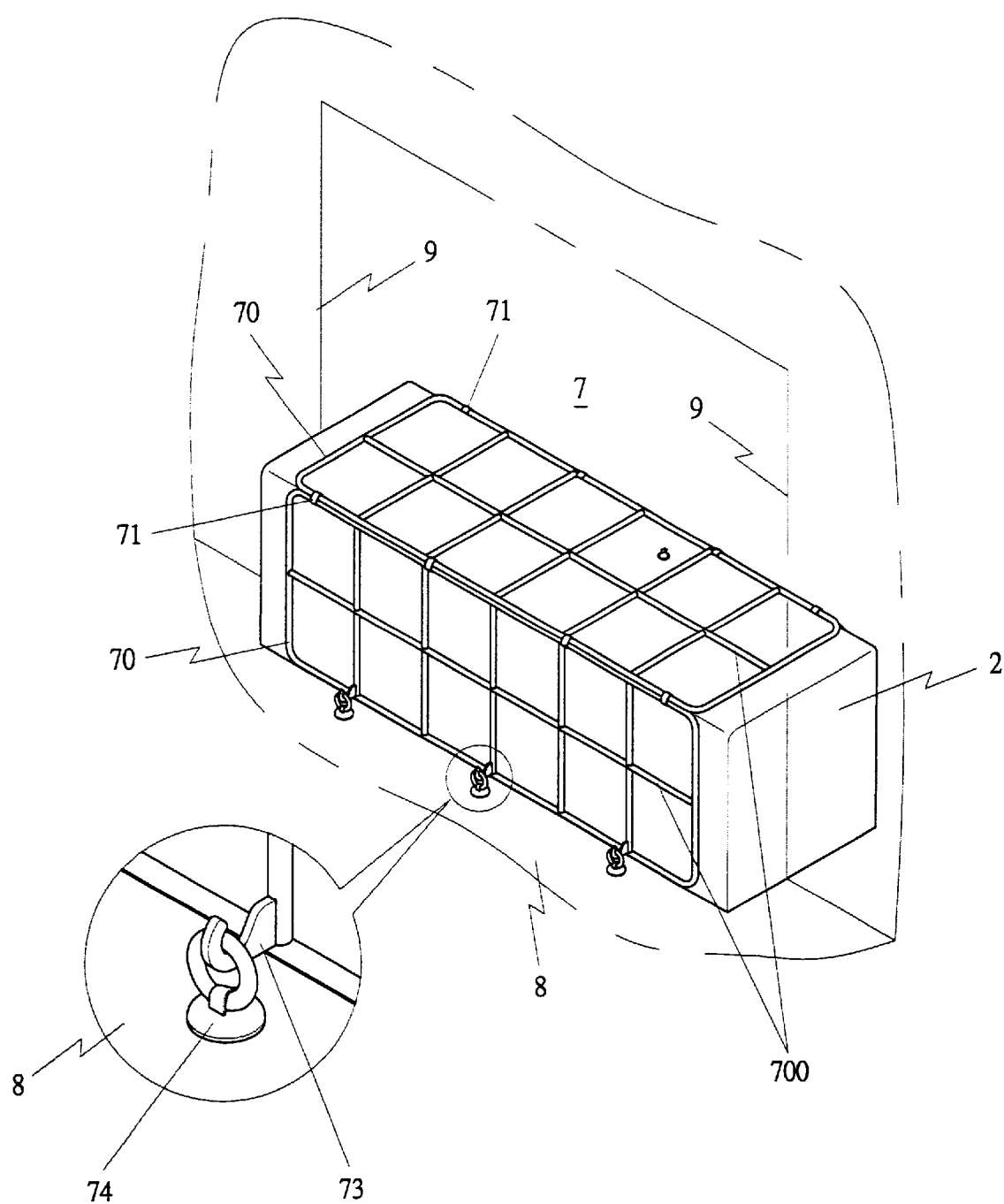
FIG. 24 is a perspective view of the first embodiment of the air charged appliances in an inflated condition assembled with the expanded frame used as a wall-stopping wall in the present invention.
Figure 25:
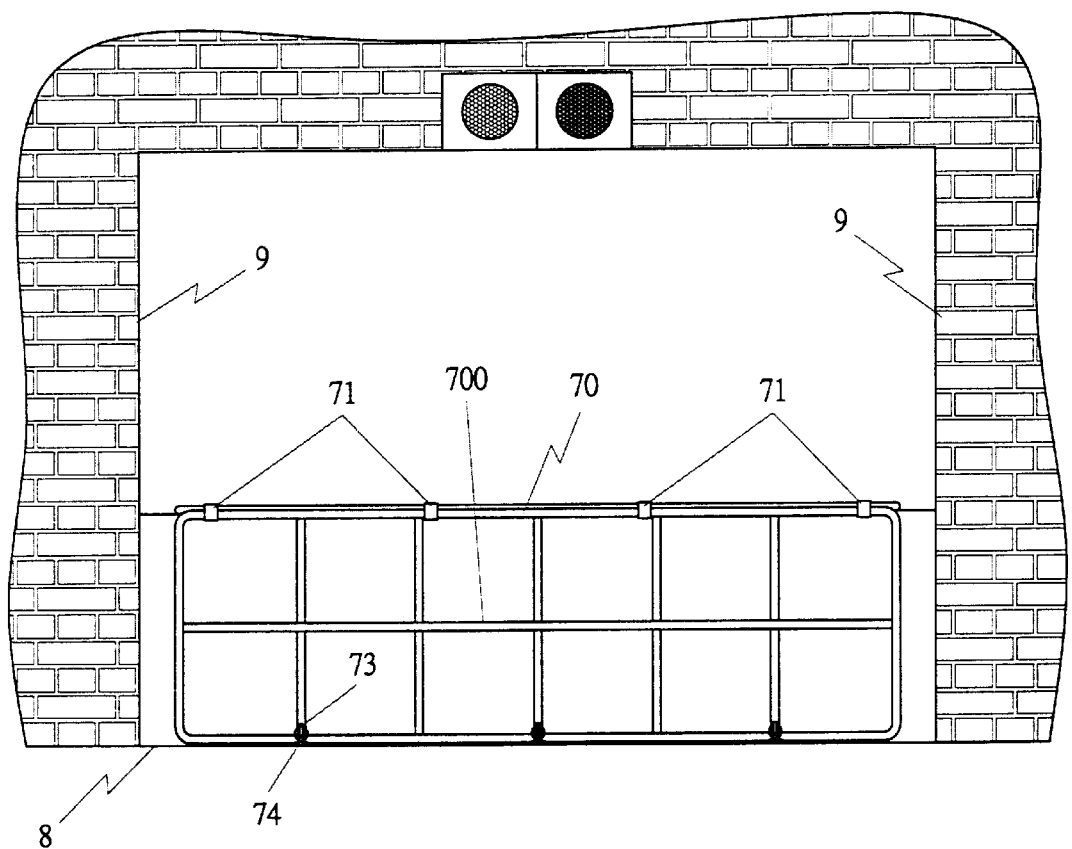
FIG. 25 is a front view of the air charged appliances assembled with the expanded frame used as water-stopping wall positioned at the entrance of a basement in the present invention.

In using, as shown in FIG. 23, the air chamber 2 is deposited in the air chamber space 75 of the frame 7 and then the air chamber 2 is filled up with air to become inflated and forced to move toward the opposite open sides 72 of the frame 7. As the size of the inflated air chamber 2 is a little larger than the air chamber space 75, the inflated air chamber 2 will expand outward and closely push against the ground 8 and the opposite walls 9. Besides, the air chamber 2 is filled with air or air and liquid so it can completely and tightly push against the ground or the walls even if they are uneven, thus able to prevent water from getting into a basement or a room.

While the preferred embodiments of the invention have been described above, it will be recognized and understood that various modifications may be made therein and the appended claims are intended to cover all such modifications that may fall within the spirit and scope of the invention.

What is claimed is:

1. An air charged appliance comprising a frame, an air chamber and an air sac put into said air chamber; said frame formed with an upper side, a front side and a rear side, said frame having an open side at opposite ends for said air chamber inflated to expand there through, said air chamber fitted inside with said air sac, said air sac pumped in air and inflated together with said air chamber but made separately from each other, said air chamber put into an air chamber space of said frame before said air chamber is inflated, said air chamber inflated and forced to expand out of said opposite open sides of said frame, said inflated air chamber forcefully expanding outward and closely pushing against the ground and opposite walls to prevent water from getting into a basement or a room.

* * * * *